(12) United States Patent
Wells et al.

(10) Patent No.: US 9,753,516 B2
(45) Date of Patent: Sep. 5, 2017

(54) METHOD, APPARATUS, AND SYSTEM FOR ENERGY EFFICIENCY AND ENERGY CONSERVATION BY MITIGATING PERFORMANCE VARIATIONS BETWEEN INTEGRATED CIRCUIT DEVICES

(75) Inventors: Ryan D. Wells, Folsom, CA (US); Avinash N. Ananthakrishnan, Hillsboro, OR (US); Efraim Rotem, Haifa (IL); Doron Rajwan, Rishon Le-Zion (IL); Gary A. Andrew, El Dorado, CA (US)

(73) Assignee: Intel Corporation, Santa Clara, CA (US)

(*) Notice: Subject to any disclaimer, the term of this patent is extended or adjusted under 35 U.S.C. 154(b) by 738 days.

(21) Appl. No.: 13/335,628

(22) Filed: Dec. 22, 2011

(65) Prior Publication Data

US 2012/0221873 A1 Aug. 30, 2012

(51) Int. Cl.
*G06F 1/00* (2006.01)
*G06F 1/32* (2006.01)

(52) U.S. Cl.
CPC ............ *G06F 1/3206* (2013.01); *G06F 1/324* (2013.01); *Y02B 60/1217* (2013.01)

(58) Field of Classification Search
CPC ................. G06F 1/3203; G06F 1/32

USPC .......................................... 713/323
See application file for complete search history.

(56) References Cited

U.S. PATENT DOCUMENTS

| | | | |
|---|---|---|---|
| 7,039,755 B1* | 5/2006 | Helms | 711/106 |
| 2007/0152732 A1* | 7/2007 | Solano | 327/525 |
| 2009/0235097 A1* | 9/2009 | Hamilton | G06F 1/3203 713/320 |
| 2010/0037038 A1* | 2/2010 | Bieswanger et al. | 712/220 |
| 2010/0115304 A1* | 5/2010 | Finkelstein et al. | 713/320 |
| 2010/0218029 A1* | 8/2010 | Floyd et al. | 713/601 |
| 2012/0084790 A1* | 4/2012 | Elshishiny | G06F 9/4893 718/108 |
| 2012/0166015 A1* | 6/2012 | Steinbrecher et al. | 700/300 |

* cited by examiner

*Primary Examiner* — Jaweed A Abbaszadeh
*Assistant Examiner* — Austin Hicks
(74) *Attorney, Agent, or Firm* — Nicholson De Vos Webster & Elliot LLP

(57) ABSTRACT

According to one embodiment of the invention, an integrated circuit device comprises one or more processor cores and a control unit coupled to the processor core(s). The control unit is adapted to control an operating frequency of at least one processor core based on an estimated activity level in lieu of a power level. The estimated activity level differing from an estimated power level by being independent of leakage power and voltage characteristics particular to that integrated circuit device.

16 Claims, 7 Drawing Sheets

METHOD, APPARATUS, AND SYSTEM FOR ENERGY EFFICIENCY AND ENERGY CONSERVATION BY MITIGATING PERFORMANCE VARIATIONS BETWEEN INTEGRATED CIRCUIT DEVICES

FIELD

Embodiments of the invention pertain to energy efficiency and energy conservation in integrated circuits, as well as code to execute thereon, and in particular but not exclusively, to mitigation of performance variations between integrated circuit devices.

GENERAL BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

As general background, processors include a variety of logic circuits fabricated on a semiconductor integrated circuit (IC). These logic circuits are collectively targeted to perform at a specific power envelope referred to as the "Thermal Design Power" (TDP). "TDP" identifies the maximum amount of power that an electronic device implemented with the processor is required to dissipate. For example, a cooling system in a computer may be designed for a 35 watt TDP, which means that it will need to dissipate heat for up to 35 watts of power usage in order to avoid exceeding the maximum junction temperature for the processor.

Besides power, different processors are targeted to perform at different frequencies depending on which stockkeeping unit "SKU" (or bin) that processor is assigned. In other words, processors are assigned to different SKUs (or bins) based on their particular TDP frequency, namely the guaranteed frequency at which the processor will run, under normal operating conditions, within the TDP constraints.

Normally, the TDP frequency is set to an operating frequency that can be maintained by the processor even when operating under its worst case conditions from a power usage perspective. One worst case condition may involve a condition where all of the processor cores are active and operating at the TDP app ratio. The "TDP app ratio" is the highest power level in real world applications.

Over time, processors have been designed to support a secondary operating mode, herein referred to as "Turbo" mode. "Turbo" mode was created because a processor rarely operates in its worst case conditions, and thus, there is normally headroom for that processor to operate at a performance level higher than the TDP frequency and still remain within established power limits.

Currently, the most common mechanisms for ensuring that power limits are not exceeded are (1) power budget management (PBM) and (2) internal power meters. PBM is a mechanism that limits the exponential running average power consumption to some programmable value over a programmable time window. As shown in equation (1), PBM performs a power evaluation for an interval ($\tau$) by determining how much power is gained or lost relative to a power budget for this interval and then exponentially smoothing this result based on a previous interval evaluation. Using this computed budget, the processor is able to decide what P-state can be used while staying within the power budget as set forth below in equation (1). The "P-state" is a frequency and voltage operating point that is scalable so that frequency can be adjusted to increase performance at the expense of higher power or frequency can be decreased to realize power savings.

$$\text{Budget} = \tau \cdot (\text{previous budget}) + (\text{power} - TDP) \cdot \Delta\tau \qquad (1)$$

A "power meter" is a processor-internal mechanism that estimates power consumption, which may be determined from leakage power and active power. Leakage power is estimated based on a reference leakage value multiplied by a function of voltage and temperature known by the processor while active power is determined as follows:

$$\text{Active power} = CV^2 f, \text{ where} \qquad (2)$$

"C" is the estimated capacitance,
"V" is the controlled voltage, and
"f" is the controlled frequency.

While the above-described mechanisms are useful for increasing processor performance (e.g. operating frequency), they do not adequately, for power conservation, constrain frequency variations between processors having the same architecture and assigned to the same SKU (or bin). Although some processors may have the same general architecture as others, they will vary widely in power consumption and operation, even within the same SKU. One reason is that actual power consumption may vary greatly due to differences in voltage vs. frequency characteristics, dynamic capacitances (Cdyns), leakage power, operating temperatures, etc. Since the power meter takes all of this per part information into account, the estimated power will also vary and result in performance disparities between processors, even ones in the same SKU, when such information is used by PBM for turbo frequency decisions.

Performance disparity between processors within the same SKU (or bin) is problematic from a business perspective, as it can lead to performance disparities in the end products (electronic devices), which may adversely effect the customer's overall impression of that product. In order to avoid bin inversions (e.g., all processors in bin X should perform as well or better than all processors in bin X−1) and support only slight variations in operating frequency for processors within the same bin, a power meter would need to be configured to report the same energy across all parts in a bin or adjust the power limits such that all parts will get the same performance despite different power levels. Retrofitting this uniformity onto something which is inherently different per part is extremely difficult given the large number of variables—workload, temperature, part characteristics, etc.

BRIEF DESCRIPTION OF THE DRAWINGS

The invention may best be understood by referring to the following description and accompanying drawings that are used to illustrate embodiments of the invention.

DETAILED DESCRIPTION

Figure 1:
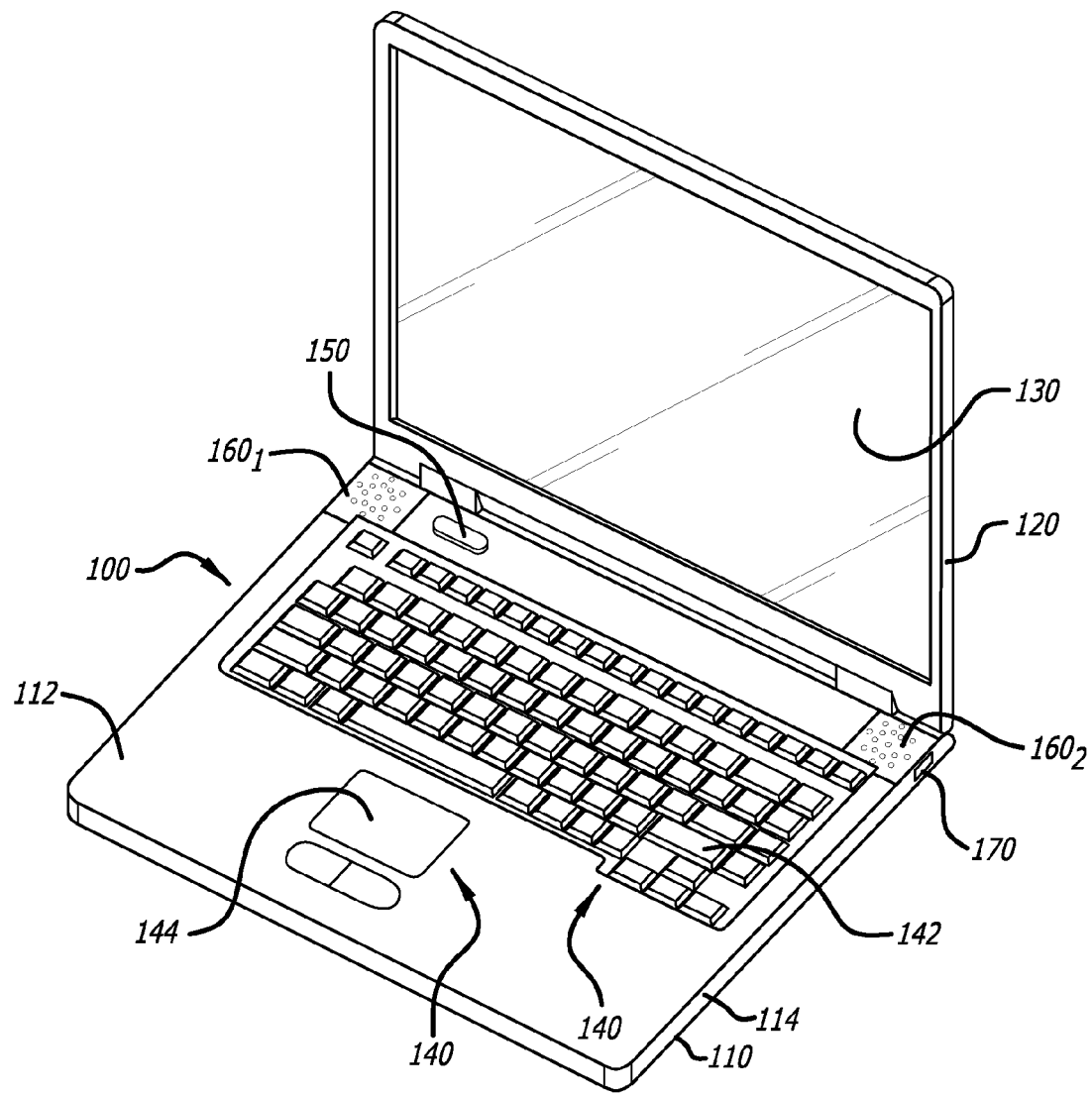
FIG. 1 is an exemplary block diagram of an electronic device implemented with an integrated circuit device with activity monitoring for performance adjustment.

Herein, certain embodiments of the invention relate to an integrated circuit device adapted to mitigate performance (e.g. operating frequency) variations with other integrated circuit devices assigned to the same SKU or bin. A corresponding method for mitigating performance variations and an electronic device implementing such integrated circuit devices is also described herein.

In order to mitigate performance variations between integrated circuit devices, internal logic within each integrated circuit device is adapted to limit the running average of, in essence, the number of gates toggled per unit time without any introduction of part variable characteristics. This new metric (activity) would take into account power meter event counts and weights, but would not take into account leakage power as well as voltage or reference Cdyn parameters normally considered for active power measurements.

Although the following embodiments are described with reference to energy conservation and energy efficiency in specific integrated circuits, such as in electronic devices or microprocessors, other embodiments are applicable to other types of integrated circuits and devices. Similar techniques and teachings of embodiments described herein may be applied to other types of circuits or semiconductor devices that may also benefit from better energy efficiency and energy conservation.

In the following description, certain terminology is used to describe features of the invention. For example, the term "integrated circuit device" generally refers to any integrated circuit or collection of integrated circuits that operate at a selected frequency to process information, and the selected frequency is limited to ensure correct operations of the device. Examples of an integrated circuit device may include, but are not limited or restricted to a processor (e.g. a single or multi-core microprocessor, a digital signal processor "DSP", or any special-purpose processor such as a network processor, co-processor, graphics processor, embedded processor), a microcontroller, an application specific integrated circuit (ASIC), a memory controller, an input/output (I/O) controller, or the like.

An "event" is generally defined as an occurrence that causes operations by the integrated circuit device. For instance, as a single example, one event is the execution of an instruction, in which weighting may be applied depending on the complexity of (amount of processing needed for) the instruction. "Activity" is a measure of the amount work happening in an integrated circuit—roughly equivalent to dynamic power without the voltage dependency. As an example, as described herein, activity may be computed based on the number of events detected upon which weighting factors have been applied thereto. One of these events may include the number of clock cycles, namely the operating frequency of the integrated circuit device.

Furthermore, the term "logic" constitutes hardware and/or software. As hardware, logic may include processing circuitry (e.g., a controller, processor, an application specific integrated circuit, etc.), semiconductor memory, combinatorial logic, or the like. As software, the logic may be one or more software modules, such as executable code in the form of an executable application, an application programming interface (API), a subroutine, a function, a procedure, an object method/implementation, an applet, a servlet, a routine, a source code, an object code, a shared library/dynamic load library, firmware, or one or more instructions.

It is contemplated that these software modules may be stored in any type of suitable non-transitory storage medium or transitory computer-readable transmission medium. Examples of non-transitory storage medium may include, but are not limited or restricted to a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive. Examples of transitory storage medium may include, but are not limited or restricted to electrical, optical, acoustical or other form of propagated signals such as carrier waves, infrared signals, and digital signals.

The term "interconnect" is broadly defined as a logical or physical communication path for information. This interconnect may be established using any communication medium such as a wired physical medium (e.g., a bus, one or more electrical wires, trace, cable, etc.) or a wireless medium (e.g., air in combination with wireless signaling technology).

Lastly, the terms "or" and "and/or" as used herein are to be interpreted as inclusive or meaning any one or any combination. Therefore, the phrases "A, B or C" and "A, B and/or C" mean any of the following: A; B; C; A and B; A and C; B and C; A, B and C. An exception to this definition will occur only when a combination of elements, functions, steps or acts are in some way inherently mutually exclusive.

I. System Architecture

Referring now to FIG. 1, an exemplary block diagram of an electronic device 100, which is implemented with one or more integrated circuit devices with activity monitoring capabilities in order to mitigate performance variations with other integrated circuit devices assigned to the same SKU (or bin) prior to deployment, is shown. Herein, electronic device 100 is realized, for example, as a notebook-type personal computer. However, it is contemplated that electronic device 100 may be a desktop computer, a television, a portable device, or an embedded application. The portable device may include, but is not limited or restricted to a cellular telephone, any portable computer including a tablet computer, an Internet Protocol device, a digital camera, a personal digital assistant (PDA), a video game console, a portable music player, or a digital camera. The embedded application typically includes a microcontroller, a digital signal processor (DSP), a system-on-a-chip, network computers (NetPC), set-top boxes, network hubs, wide area network (WAN) switches, or any other system that can perform the functions and operations taught below. Moreover, the electronic devices, methods, and systems described herein are not limited to physical computing devices, but may also relate to software optimizations for energy conservation and efficiency. As will become readily apparent in the description below, the embodiments of methods, electronic devices, and systems described herein (whether in reference to hardware, firmware, software, or a combination thereof) are vital to a 'green technology' future, such as for power conservation and energy efficiency in products that encompass a large portion of the US economy.

As shown in FIG. 1, electronic device 100 includes a housing 110 and a display unit 120. According to this embodiment of the invention, display unit 120 includes a liquid crystal display (LCD) 130 which is built into display unit 120. According to one embodiment of the invention, display unit 120 may be rotationally coupled to housing 110 so as to rotate between an open position where a top surface 112 of housing 110 is exposed, and a closed position where top surface 112 of housing 110 is covered. According to another embodiment of the invention, display unit 120 may be integrated into housing 110.

Referring still to FIG. 1, housing 110 may be configured as a thin box-shaped housing. According to one embodiment of the invention, an input device 140 is disposed on top surface 112 of housing 110. As shown, input device 140 may be implemented as a keyboard 142 and/or a touch pad 144. Although not shown, input device 140 may be touch-screen display 130 that is integrated into housing 110, or input device 140 may be a remote controller if electronic device 100 is a television.

Other features include a power button 150 for powering on/off electronic device and speakers $160_1$ and $160_2$ disposed on top surface 112 of housing 110. At a side surface 114 of housing 110 is provided a connector 170 for downloading and uploading information. According to one embodiment, connector 170 is a Universal Serial Bus (USB) connector although another type of connector may be used.

As an optional feature, another side surface of electronic device 100 may be provided with high-definition multimedia interface (HDMI) terminal which support the HDMI standard, a DVI terminal or an RGB terminal (not shown). The HDMI terminal and DVI terminal are used in order to receive or output digital video signals with an external device.

Figure 2:
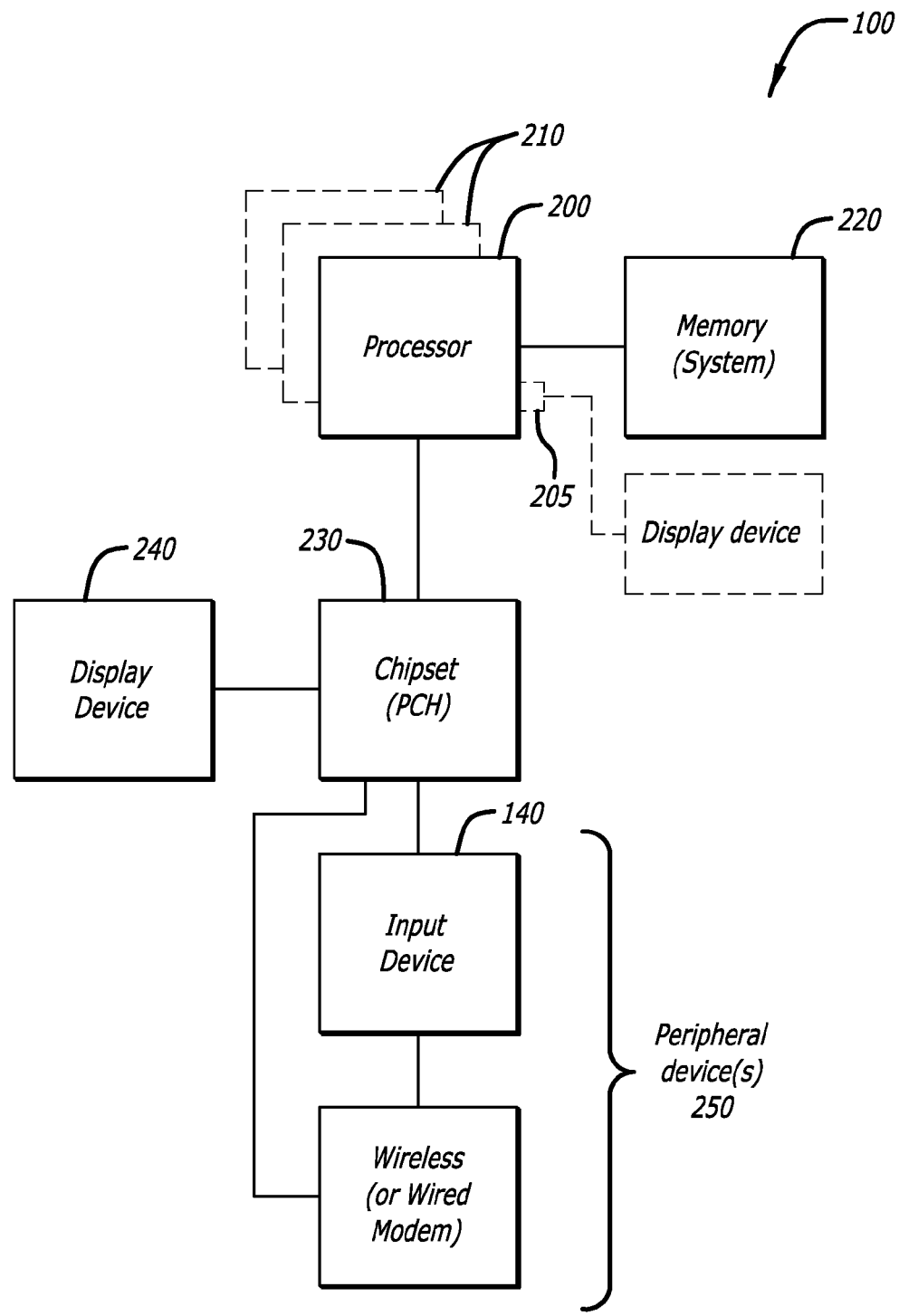
FIG. 2 is a first exemplary block diagram of the system architecture implemented within the electronic device of FIG. 1 or another electronic device.

Referring now to FIG. 2, a first exemplary block diagram of the system architecture implemented within electronic device 100 of FIG. 1 is shown. Herein, electronic device 100 comprises one or more processors 200 and 210. Processor 210 is shown in dashed lines as an optional feature as electronic device 100 may be adapted with a single processor as described below. Any additional processors, such as processor 210, may have the same or different architecture as processor 200 or may be an element with processing functionality such as an accelerator, field programmable gate array (FPGA), DSP or the like.

Herein, processor 200 comprises an integrated memory controller (not shown), and thus, is coupled to memory 220 (e.g., non-volatile or volatile memory such as a random access memory "RAM"). Furthermore, processor 200 is coupled to a chipset 230 (e.g., Platform Control Hub "PCH") which may be adapted to control interaction between processor(s) 200 and 210 and memory 220 and incorporates functionality for communicating with a display device 240 (e.g., integrated LCD) and peripheral devices 250 (e.g., input device 140 of FIG. 1, wired or wireless modem, etc.). Of course, it is contemplated that processor 200 may be adapted with a graphics controller (not shown) so that display device 240 may be coupled to processor 200 via a Peripheral Component Interconnect Express (PCI-e) port 205.

Figure 3:
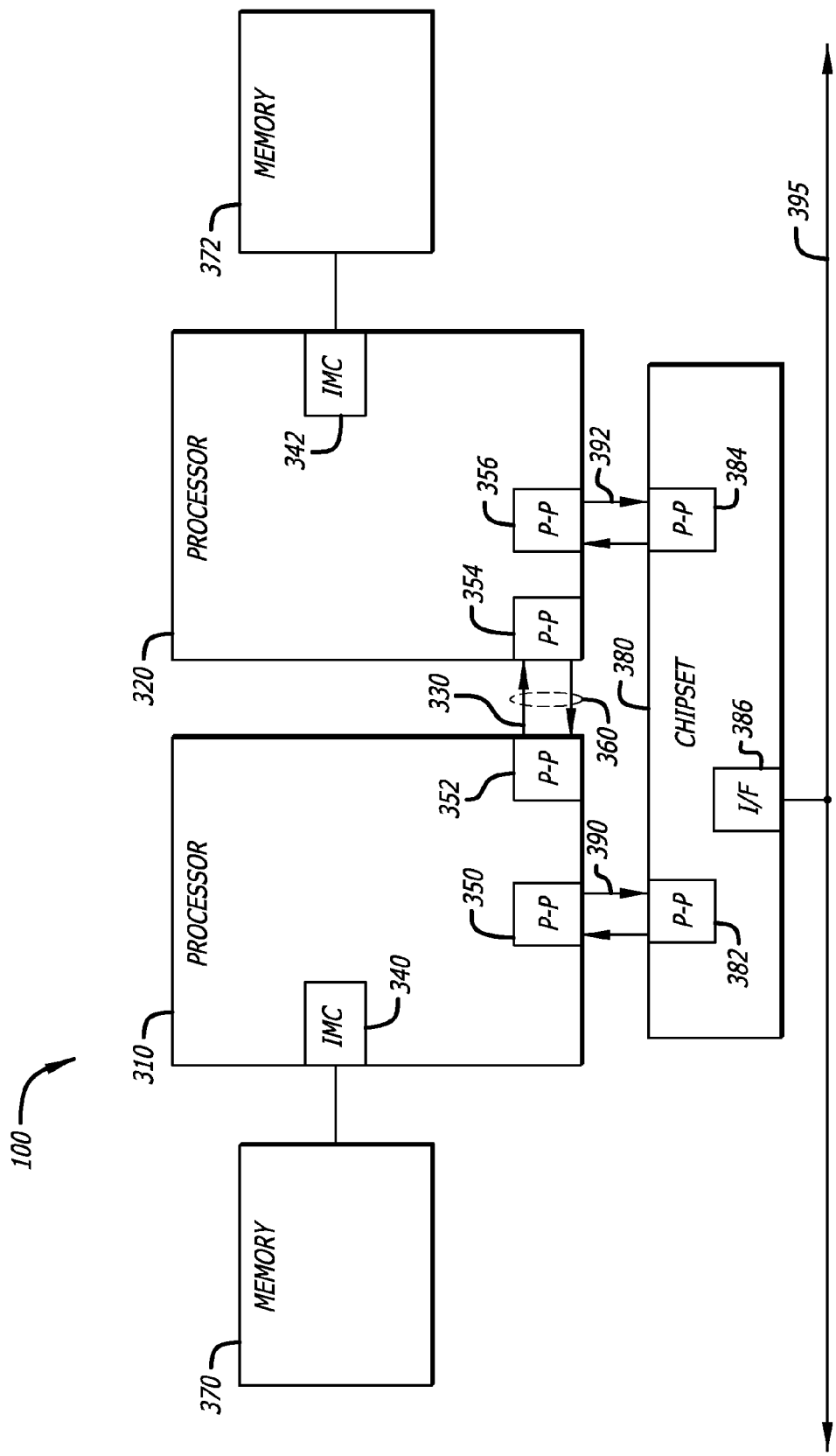
FIG. 3 is a second exemplary block diagram of the system architecture implemented within the electronic device of FIG. 1 or another electronic device.

Referring now to FIG. 3, a second exemplary block diagram of the system architecture implemented within electronic device 100 of FIG. 1 is shown. Herein, electronic system 100 is a point-to-point interconnect system, and includes first processor 310 and second processor 320 coupled via a point-to-point (P-P) interconnect 330. As shown, processors 310 and/or 320 may be some version of processors 200 and/or 210 of FIG. 2, or alternatively, processor 310 and/or 320 may be an element other than a processor such as an accelerator or FPGA.

First processor 310 may further include an integrated memory controller hub (IMC) 340 and P-P circuits 350 and 352. Similarly, second processor 320 may include an IMC 342 and P-P circuits 354 and 356. Processors 310 and 320 may exchange data via a point-to-point (P-P) interface 360 using P-P circuits 352 and 354. As further shown in FIG. 3, IMC 340 and IMC 342 couple processors 310 and 320 to their respective memories, namely memory 370 and memory 372, which may be portions of main memory locally attached to respective processors 310 and 320.

Processors 310 and 320 may each exchange data with a chipset 380 via interfaces 390 and 392 using P-P circuits 350, 382, 356 and 384. Chipset 380 may be coupled to a first bus 395 via an interface 386. In one embodiment, first bus 395 may be a Peripheral Component Interconnect Express (PCI-e) bus or another third generation I/O interconnect bus, although the scope of the present invention is not so limited.

Figure 4:
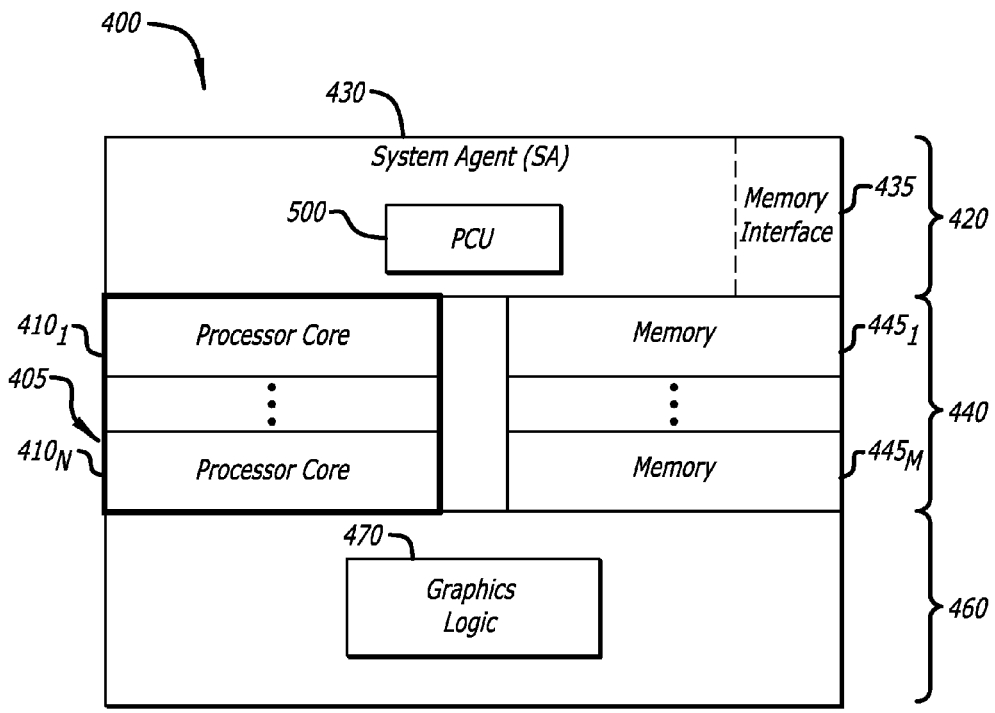
FIG. 4 is a first exemplary block diagram of the packaged integrated circuit device with activity monitoring as a single-core or multi-core processor having an integrated graphics and system agent.

Referring to FIG. 4, a first exemplary block diagram of an integrated circuit device 400 supporting an activity monitoring scheme is shown. Herein, integrated circuit device 400 constitutes multi-core processor 200, which includes a compute engine 405 that includes multiple (N≥2) processor cores $410_1$-$410_N$. However, it is contemplated that compute engine 405 may include a single processor core $410_1$ and/or multiple elements with processing functionality.

More specifically, multi-core processor 200 is partitioned to include a plurality of power planes 420, 440 and 460. Herein, voltage and/or frequency of power planes 440 and 460 may be adjusted upward or downward so that the overall performance of the part can be adjusted depending on the workload needed. As a result, the electronic device can be adapted to operate at the most efficient power point. However, it is contemplated that the power plane architecture described herein is extensible to any number of variable voltage/frequency domains with arbitrary compute engine(s) implemented thereon.

Herein, a control unit 430, referred to herein a "system agent" (SA), is implemented on first power plane 420 that supports the application of a fixed voltage and frequency to SA 430. SA 430 may be implemented with a memory interface 435 (e.g. double data rate "DDR" memory interface) where the operating frequency of memory interface 435 is set at boot time and does not vary dynamically based on the workload. The operating frequency of memory interface 435 can vary depending on the speed of the DDR memory implemented within the electronic device.

As further shown in FIG. 4, second power plane 440 includes processor cores $410_1$-$410_N$ and a plurality of on-chip memories $445_1$-$445_M$ (M≥1) coupled thereto. These on-chip memories $445_1$-$445_M$ may be last-level caches (LLCs) each corresponding to one of the processor cores $410_1$-$410_N$ (M=N). Second power plane 440 supports the variation of voltage and/or frequency applied to components implemented on this power plane. For instance, the voltage and/or frequency applied to processor core $410_1$ may be varied based on the detected activity level as described below.

As also shown in FIG. 4, third power plane 460 includes graphics logic 470. Third power plane 460, which supports the variation of voltage and/or frequency applied to components implemented thereon, is controlled independently from voltage and frequency changes of second power plane 440. For instance, the voltage and/or frequency applied to graphics logic 470 may be varied based on the detected activity level as described below and may be independent from voltage and frequency variations applied to second power plane 440.

It is contemplated that the voltage and frequency adjustment is directed to "active power management" in which the processor cores $410_1$-$410_N$ and/or graphics logic 470 are active and performance needs are being matched with workload.

In accordance with one embodiment of the invention, the change in voltage and/or frequency in power planes 440 and 460 are managed by specific logic within SA 430, namely a Power Control Unit (PCU) 500. A hybrid of hardware and firmware, PCU 500 is effectively a controller that manages all of the power management associated with integrated circuit device 400.

Figure 5:
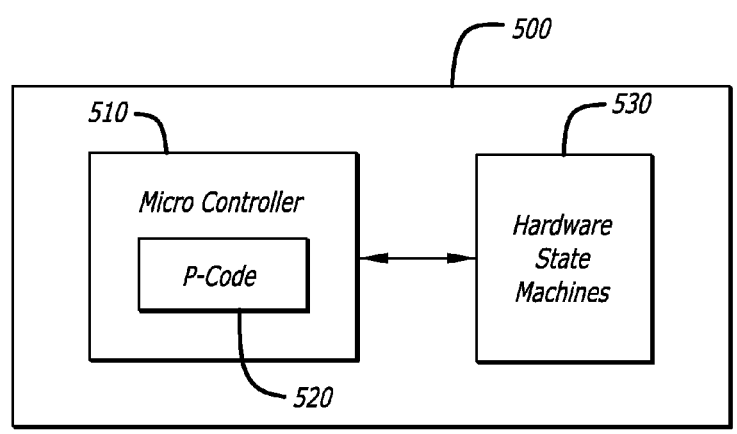
FIG. 5 is an exemplary block diagram of firmware implemented within the system agent unit of the processor of FIG. 4.

Referring now to FIG. 5, one embodiment of SA 430 features PCU 500 is shown. PCU 500 includes a microcontroller 510 that runs firmware 520 (P-code) for controlling power management of integrated circuit device 400. One of the power management functions is to manage P-states of all of the compute engines (e.g., processor cores $410_1$-$410_N$, graphics logic 470, etc.). One component of the P-state decision is choosing a P-state that fits within the activity limit. In order to manage the activity limit, P-code 520 estimates activity based on weighted accumulation of micro-architectural events. The event counts and weights are digital and deterministic across similarly configured parts so that the activity estimate will not vary on a part-to-part basis. As an ancillary benefit, a deterministic frequency is achievable as a by-product from the activity limiting algorithm which monitors each of the activity constraints and, where appropriate, adjusts the P-state (representing frequency and voltage operating point) as needed. This effectively handles performance variability issues.

SA 430 further includes hardware state machines 530 that control the transitioning in voltage and frequency for power planes 440 and 460.

According to one embodiment of the invention, as shown in FIGS. 4 and 5, processor cores $410_1$-$410_N$ are implemented in which each of processor cores $410_1$-$410_N$ is associated with an assigned TPD frequency. Based on the current work level that is needed, PCU 500 is adapted to control processor cores $410_1$-$410_N$ and, based on the estimated activity and predetermined activity limits, adjust the frequency within a predetermined range above the TDP frequency. Such control is performed based on deterministic parameters as set forth in FIG. 6.

II. System Operations

Figures 6, 7:
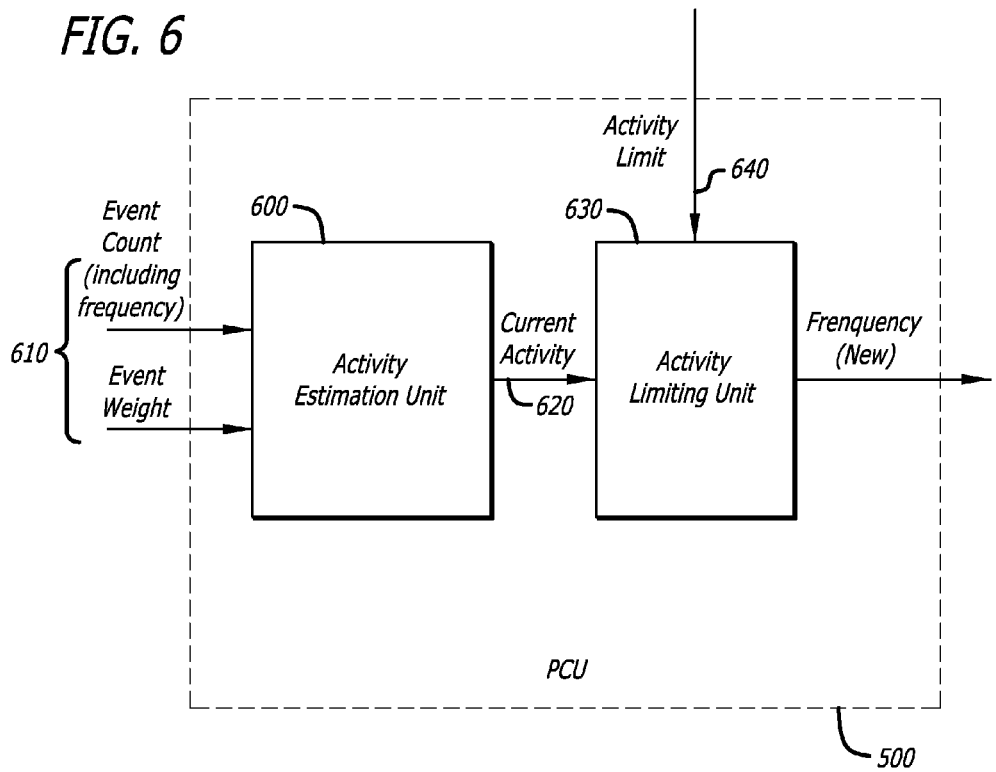
FIG. 6 is an exemplary embodiment of activity estimation and computations to adjust the operating frequency of the processor of FIG. 4 in accordance with an embodiment of the invention.
FIG. 7 is an exemplary embodiment of a table for activity limits for different SKUs (or bins).

Referring now to FIG. 6, an exemplary embodiment of activity estimation and computations performed by PCU 500 of FIG. 5 to adjust the operating frequency of integrated circuit device 400 of FIG. 4 is shown. It is contemplated that power conversation (and regulation) is desired as parts will be binned to and what the system thermal designs will be able to cool. In order to minimize variability or ensure power conservation, we knowingly compromise some performance as described above. That is done by looking at the worst case part for a particular SKU (or bin) and calculating the activity limit which guarantees that the part will stay within the power budget. Such operations could all be done during manufacturing and are designed to remove voltage and power leakage from activity computations. As a result, all parts within a SKU are regulated to that activity limit and you get deterministic performance for all parts within the given SKU.

More specifically, activity estimate unit 600 of PCU 500 actively or passively monitors for events 610 that are used to determine an amount of workload currently experienced by the integrated circuit device. For example, according to one embodiment of the invention, one or more counters (not shown) may be implemented within the compute engine and configured to monitor different events. One type of event involves the number of different types of instructions executed by its processor core(s). Thereafter, a weighting is applied to each count value and these count values are summed to produce a weighted count value. The "weighted count value" may be accumulated locally by compute engine 405 before reporting the same to PCU 500.

According to this embodiment of the invention, as illustrated in FIG. 6, events are monitored over a prescribed time window and weighted by activity estimation unit 600. The weighted count value constitutes the estimated current activity.

Alternatively, it is contemplated that one or more counters may be implemented within the compute engine to detect events within different components of the compute engine. As an example, for illustrative purposes, a detected event may be an instruction executed by one or more processor cores or a number of clock cycles. However, in lieu of accumulating the weighted count value locally by compute engine 405 of FIG. 4, the count value from the counter(s) is provided to PCU 500. The count value(s) are weighted by firmware (P-code) executed by PCU 500, where the weighting may be applied depending on the complexity of (amount of processing needed) for the instruction.

Thereafter, estimated current activity 620 is input into an activity limiting unit 630. Activity limiting unit 630 is adapted to compare the estimated current activity 620 to an activity limit 640. The activity limit for a particular SKU is computed by taking into account worst case conditions for voltage (V) and leakage power ($L_{Ref} \times f(V,T)$) across all of the parts within a SKU and all workloads according to equation (3).

$$\text{Activity Limit} = [\text{Power Limit} - \text{Leakage Power}]/V^2 \quad (3)$$

According to one embodiment, activity limit 640 for different SKUs (or bins) may be stored in a table 700 as set forth in FIG. 7. Alternatively, the activity limited would be fused into the integrated circuit device and accessible by P-code 520.

Thereafter, activity limit unit 630 performs an activity budget analysis that is designed to limit the exponential running average activity consumption to some programmable value over a programmable time window. As shown in equation (4), activity evaluation is performed over an interval by determining how much activity is gained or lost relative to an activity budget for this interval and then exponentially smoothing this result based on a previous interval evaluation. Using this computed budget, the processor selects a voltage and frequency operating point (P-state) which maximizes performance while staying within the activity limit.

$$\text{Budget} = \tau \cdot (\text{previous budget}) + (\text{activity} - \text{activity limit}) \cdot \Delta \tau \quad (4)$$

Figure 8:
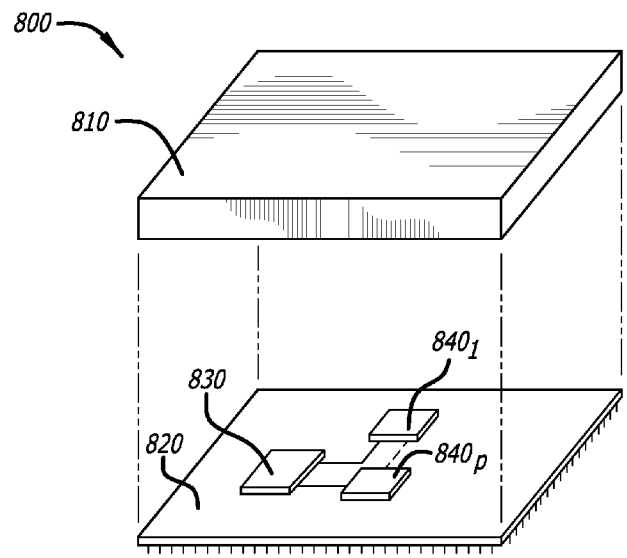
FIG. 8 is a second exemplary block diagram of the packaged integrated circuit device with activity monitoring as a packaged multi-processor unit with at least one of the processors supporting activity monitoring.

Referring now to FIG. 8, a second exemplary block diagram of the packaged integrated circuit device with activity monitoring as a packaged multi-processor unit with at least one of the processors supporting activity monitoring is shown. Herein, packaged integrated circuit device 800 includes a package 810 partially or fully encapsulating a substrate 820. Substrate 820 comprises a controller 830 that is adapted to monitor and limit frequency and voltage based on activity limits realized by other integrated circuit devices $840_1$-$840_P$ (P≥2) on substrate 820. Hence, controller 830 performs the above-described operations of the PCU implemented in accordance with the integrated circuit (die) architecture shown in FIG. 4.

Figure 9:
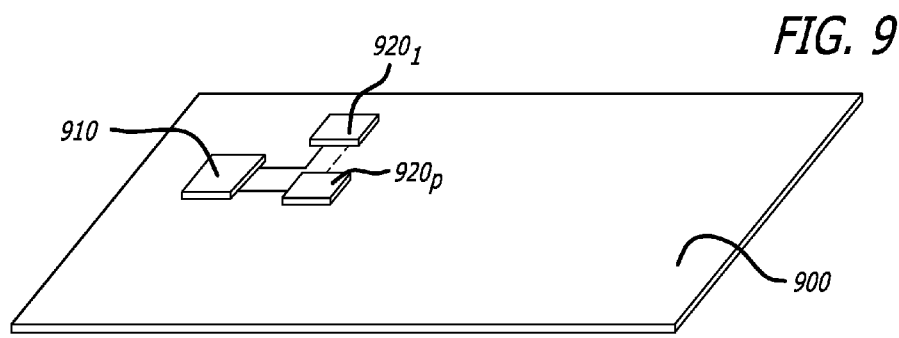
FIG. 9 is a third exemplary block diagram of the packaged integrated circuit device with activity monitoring implemented on a circuit board.

Referring now to FIG. 9, a third exemplary block diagram of the packaged integrated circuit device with activity monitoring implemented on a circuit board 900 is shown. Herein, a packaged integrated circuit device 910 is mounted on circuit board 900 and is adapted as a controller to monitor and limit frequency and voltage levels for different segments of circuit board 900 based on activity limits realized by other integrated circuit devices $920_1$-$920_P$ (P≥1) on circuit board 900. Hence, controller 910 performs the above-described operations of the PCU implemented in accordance with the integrated circuit (die) architecture shown in FIG. 4.

Figure 10:
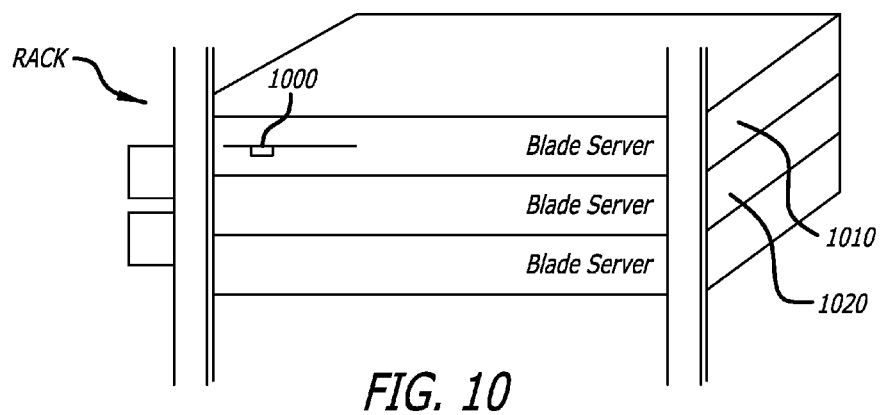
FIG. 10 is an exemplary block diagram of an integrated circuit device with activity monitoring implemented within a blade server that is in communication with other blade servers.

Referring to FIG. 10, an exemplary block diagram of the electronic device implemented with an integrated circuit device 1000 implemented with a blade server 1010 for activity monitoring is shown. Herein, packaged integrated circuit device 1000 is adapted as a controller to monitor and limit frequency and voltage levels for different blade servers 1020 other than blade server 1010. Hence, controller 1000 performs the above-described operations of the PCU implemented in accordance with the integrated circuit (die) architecture shown in FIG. 4.

It is noted that these different embodiments are different systems built around a single integrated circuit w/built-in activity monitoring. Note that the activity estimation/limiting and P-state decision could also be done by a controller in a separate chip (e.g., an embedded controller sitting on the platform watching and managing CPU activity levels).

Figure 11:
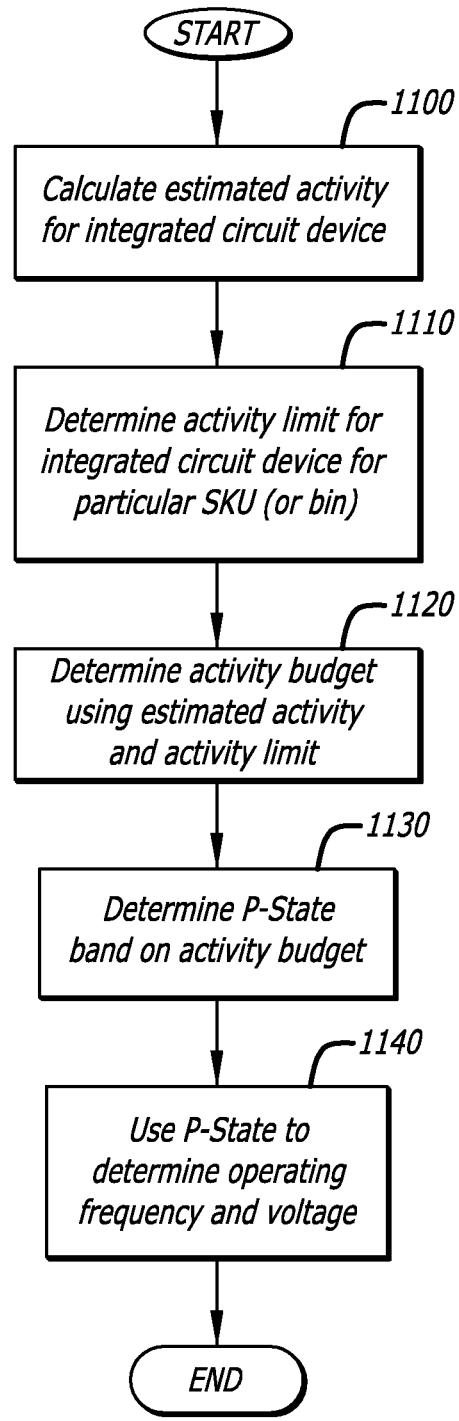
FIG. 11 is an exemplary flowchart of the operations conducted by the integrated circuit device for activity monitoring in order to mitigate of performance variations between integrated circuit devices within the same SKU (or bin).

Referring now to FIG. 11, an exemplary flowchart of the operations conducted by an integrated circuit device for activity monitoring in order to mitigate of performance variations between integrated circuit devices within the same SKU (or bin) is shown. First, an estimated activity is calculated based on data that does not substantially vary from device to device (block 1100). For instance, as an illustrative embodiment of the invention, the estimated activity may be computed by counting and weighting micro-architectural events.

Next, the activity limit for a SKU (or bin) associated with the integrated circuit device is determined (block 1110). Such determination may be fetching the activity limit from a fuse or another storage device. Thereafter, the activity budget for the integrated circuit device over a selected period of time is determined (block 1120). From this activity budget, it can be determined what P-state is represented by the activity budget (block 1130). This P-state can be used to determine what operating frequency and voltage is to be used by the integrated circuit device (block 1140).

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. An integrated circuit device comprising:
   at least one processor core; and
   a control unit coupled to the at least one processor core, the control unit to control an operating setting for the integrated circuit device by controlling an operating frequency of the at least one processor core based on an estimated activity level and an activity limit, the estimated activity level being independent of leakage power and voltage characteristics particular to the integrated circuit device, wherein the estimated activity level is based on a number of events of particular types detected upon which weighting factors have been applied depending on the complexity and amount of processing needed for a type of instruction, one of these events being a number of clock cycles and one of these events being a count of a number of different types of instructions executed, wherein the control unit is to determine a limit in the operating frequency by comparing the estimated activity level to the activity limit for a stock-keeping unit (SKU) in which the integrated circuit device is assigned, wherein the activity limit of the SKU guarantees that the integrated circuit device will stay within a power budget.

2. The integrated circuit device of claim 1 further comprising:
   a ring interconnect coupled to the at least one processor core and the control unit;
   a graphics logic coupled to the ring interconnect.

3. The integrated circuit device of claim 2, wherein the control unit is located on a first power plane, memory and the at least one processor core are located on a second power plane, and the graphics logic is located on a third power plane.

4. The integrated circuit device of claim 1, wherein the activity limit is to be computed by taking into account worst case conditions for voltage and leakage power for devices within the stock-keeping unit (SKU) in which the integrated circuit device is assigned.

5. The integrated circuit device of claim 1, wherein the control unit is a system agent positioned on a different power plane than the at least one processor, the system agent includes a micro-controller that is to run firmware for controlling power management of power planes of the integrated circuit device based on activity that is based on detected events, weighting associated with the detected events for the integrated circuit device.

6. The integrated circuit device of claim 1, wherein the control unit is situated on a separate integrated circuit than the at least one processor, both the control unit and the at least one processor being implemented within a single integrated circuit package.

7. The integrated circuit device of claim 1, wherein the control unit is situated on a separate integrated circuit than the at least one processor, both the control unit and the at least one processor being implemented on a single circuit board.

8. An electronic device comprising:
a housing;
a display unit including a liquid crystal display; and
an integrated circuit device implemented with the housing, the integrated circuit device comprises at least one processor core, and a control unit coupled to the at least one processor core, the control unit to control an operating setting for the integrated circuit device by controlling an operating frequency of at least one compute engine of the at least one processor core based on an estimated activity level, the estimated activity level differing from an estimated power level by being independent of leakage power and voltage characteristics particular to the integrated circuit device, wherein the estimated activity level utilized by the integrated circuit device is based on a count of a number of different types of instructions executed upon which weighting factors have been applied depending on the complexity and amount of processing needed for the type of instruction, wherein the control unit to determine a maximum increase in the operating frequency by comparing the estimated activity level to an activity limit for a stock-keeping unit (SKU) in which the integrated circuit device is assigned, wherein the activity limit of the SKU guarantees that the integrated circuit device will stay within a power budget.

9. The electronic device of claim 8, wherein the at least one compute engine of the integrated circuit device includes at least one processor core.

10. The electronic device of claim 8, wherein the integrated circuit device further comprises a ring interconnect coupled to the at least one processor core and the control unit, and a graphics logic coupled to the ring interconnect.

11. The electronic device of claim 10, wherein the control unit of the integrated circuit device comprises a micro-controller is to control power management of power planes of the integrated circuit device based on activity that is based on detected events.

12. The electronic device of claim 8, wherein the activity limit is determined by the control unit of the integrated circuit device taking into account worst case conditions for voltage and power leakage for devices within the stock-keeping unit (SKU) in which the integrated circuit device is assigned.

13. The electronic device of claim 8, wherein the control unit of the integrated circuit device is a system agent positioned on a different power plane than the at least one processor, the system agent includes a micro-controller that is to run firmware for controlling power management of power planes of the integrated circuit device based on activity that is based on detected events, weighting associated with the detected events and the operating frequency for the integrated circuit device.

14. A method comprising:
calculating an estimated activity level for an integrated circuit device based on a count of detected events of particular types and weightings applied to the detected events based on the complexity and amount of processing needed for a type of instruction, wherein one type of detected event is a count of a number of different types of instructions executed;
determining an activity budget for the integrated circuit device over a selected period of time for use in power conservation using the estimated activity level;
determining an operating state for the integrated circuit device based on the activity budget, the operating state being used to determine a frequency, and voltage operating point for the integrated circuit device; and
determining a maximum increase in the operating frequency by comparing the estimated activity level to an activity limit for a stock-keeping unit (SKU) in which the integrated circuit device is assigned, wherein the activity limit of the SKU guarantees that the integrated circuit device will stay within a power budget.

15. The method of claim 14, wherein the estimated activity level is calculated internally within the integrated circuit device using information from at least one pre-programmed fuse within the integrated circuit device.

16. The method of claim 14, wherein the operating state is a processor state of the integrated circuit device where the integrated circuit device is a processor.

* * * * *